United States Patent [19]

Bauer et al.

[11] 4,277,641
[45] Jul. 7, 1981

[54] ELECTRICAL OUTLET BOX AND CABLE CLAMP DEVICE

[75] Inventors: Claude J. Bauer; Kenneth M. Moore, both of Parkersburg, W. Va.

[73] Assignee: GTE Products Corporation, Stamford, Conn.

[21] Appl. No.: 78,998

[22] Filed: Sep. 26, 1979

[51] Int. Cl.³ .............................................. H02G 3/08
[52] U.S. Cl. .............................. 174/65 R; 339/103 R
[58] Field of Search ............................... 174/65 R, 53; 339/103 R, 103 M; 220/3.2, 3.3, 3.4, 3.5, 3.6; 285/128, 129

[56] References Cited

U.S. PATENT DOCUMENTS

| | | | |
|---|---|---|---|
| 2,556,977 | 6/1951 | Paige | 285/128 |
| 4,012,580 | 3/1977 | Arnold | 174/53 |
| 4,202,457 | 5/1980 | Tansi | 220/3.5 X |

FOREIGN PATENT DOCUMENTS

| | | | |
|---|---|---|---|
| 486331 | 9/1952 | Canada | 174/65 R |
| 658728 | 3/1963 | Canada | 174/65 R |
| 2259667 | 6/1974 | Fed. Rep. of Germany | 174/65 R |

Primary Examiner—Gene Z. Rubinson
Assistant Examiner—D. A. Tone
Attorney, Agent, or Firm—Jerry F. Janssen

[57] ABSTRACT

An electrical wiring box with attachable clamp for non-metallic sheathed cable comprises, in combination, a wiring box with attachment receiving means for mounting a cable clamp device interior to the box adjacent to a knock-out, and a cable clamp device. The clamp device comprises a base and support members with a hinged resilient flap. Non-metallic sheathed cable is clamped between the flap member and the base member of the clamp device. Attachment means on the clamp device provide for mounting of the clamp device in the attachment receiving means of the wiring box.

17 Claims, 15 Drawing Figures

ELECTRICAL OUTLET BOX AND CABLE CLAMP DEVICE

BACKGROUND OF THE INVENTION

This invention relates to electrical wiring boxes and electrical wiring cable clamp devices. More particularly, it is concerned with cable clamp inserts for electrical wiring boxes for use with non-metallic sheathed cable.

To relieve strain upon wiring connections to devices mounted in electrical wiring boxes, it is the general practice to clamp the cable at the point where it enters the box. Previously known clamp devices are of types which either fasten into the wiring box knock-out or attach to the wall of the box by means of a screw or bolt. In the case of the latter type of clamp, the cable, passing through a knockout opening in the wall of the box, is clamped between a wall of the box and a yoke tightened against the box wall. These yoke-type clamps require threaded openings in the box wall for their attachment, a feature which adds to the overall cost of the finished box and the time required for its installation. Moreover, suppliers of electrical wiring boxes generally furnish such clamps already in place at each knock-out to minimize installation time. This practice further adds to the cost of electrical wiring boxes employing this type of clamp.

SUMMARY OF THE INVENTION

Improved electrical wiring box arrangements in accordance with the present invention include, in combination, a wiring box and a cable clamp device. The wiring box has a wall structure which includes a knock-out region for providing an opening to receive non-metallic sheathed cable. The wall structure of the wiring box further includes attachment receiving means for mounting a cable clamp device interior to the box adjacent to a knock-out.

The cable clamp device comprises a base member having a first cable engaging means and an attaching means for mounting the clamp device in the attachment receiving means of the wiring box wall structure. First and second support members of the clamp device are attached at one end to the base member and at the other end to a connecting member which is disposed between the support members.

A depending flap member of the clamp device has one end hingedly and resiliently attached to the connecting member. The other end of the depending flap provides a second cable engaging means. The second cable engaging means of the depending flap member opposes and is spaced apart from the first cable engaging means.

When a non-metallic sheathed cable is passed through a knock-out opening in the wiring box which has a cable clamp mounted in place, interior to the wiring box and adjacent to the opening, the cable deflects or bends the resilient flap of the cable clamp inwardly from its normal position to permit passage of the cable between the free end of the flap and the base member of the clamp device. The non-metallic sheathed cable is then gripped between the first cable engaging means of the base member and the second engaging means of the depending flap member.

The flap member is resiliently attached to the connecting member so as to bear against the cable, in turn forcing the cable against the base member of the clamp device. The cable is thus firmly gripped by the clamp device and prevented from being withdrawn under normal circumstances. However, a non-metallic sheathed cable inserted into the clamp device can be further inserted through the clamp device and into the wiring box with ease by pushing or pulling the cable.

In one embodiment of the present invention, the depending flap member of the clamp device is provided with a tool-receiving slot. A cable inserted into the clamp device can thus be removed if the need should arise by inserting a tool such as a screwdriver in the tool-receiving slot and prying upward on the flap member to release the cable.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

Figure 1:
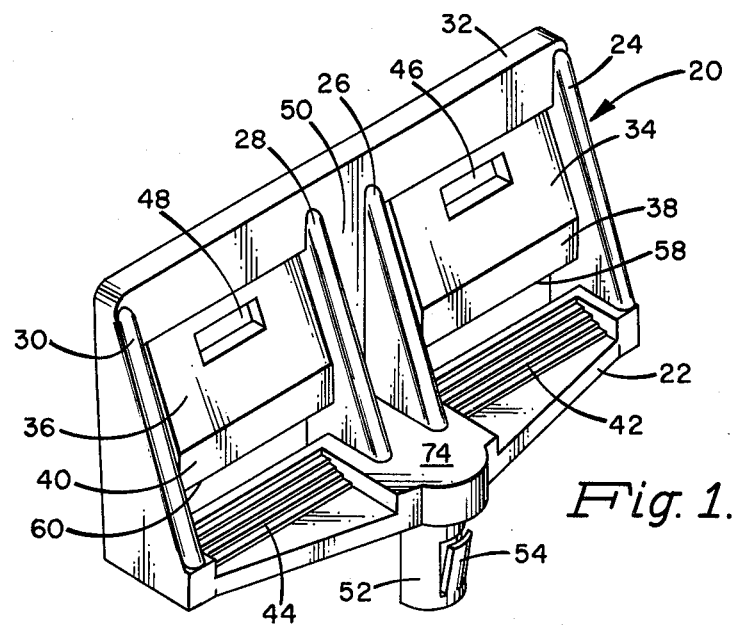
FIGS. 1 and 2 present perspective front and rear views, respectively, of a cable clamp in accordance with the present invention.
Figure 2:
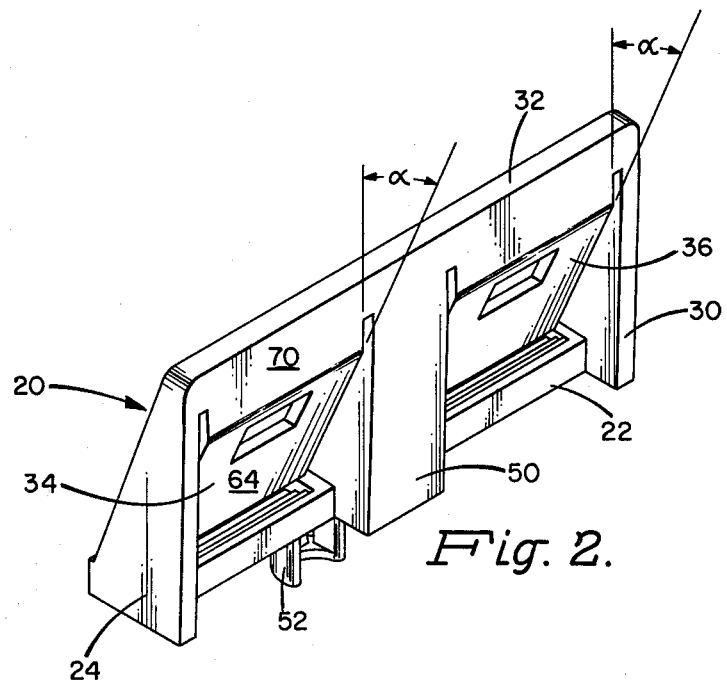

A preferred embodiment of a cable clamp device for use with non-metallic sheathed cable in accordance with the present invention is shown in perspective front and rear view in FIGS. 1 and 2, respectively.

Figure 3:
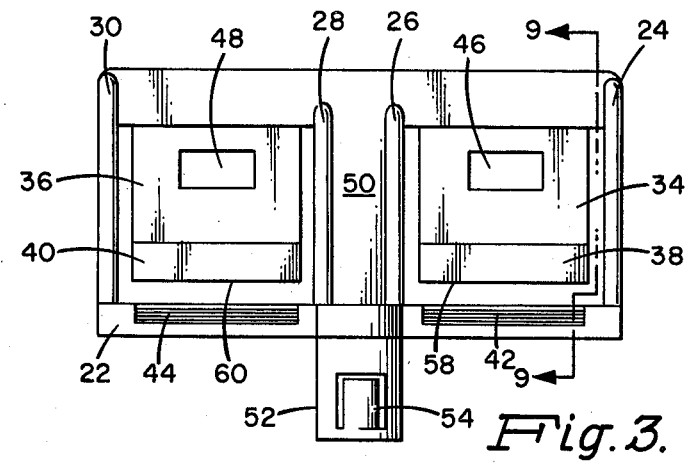
FIGS. 3 and 4 present full front and rear views, respectively, of the clamp device of FIGS. 1 and 2.
Figure 4:
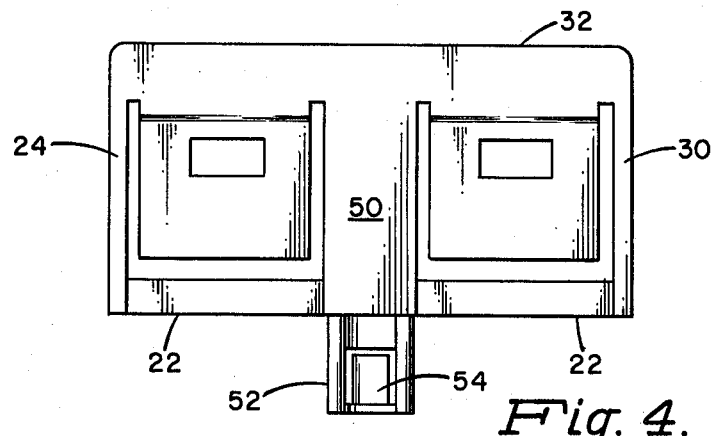
Figure 5:
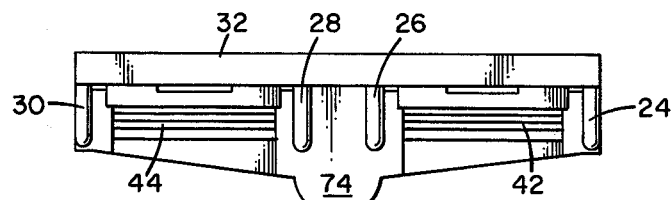
FIGS. 5, 6, 7, and 8 present full top, bottom, right side, and left side views, respectively, of the cable clamp device of FIGS. 1 and 2.

The clamp device 20 comprises a base member 22 to which are attached pairs of support members 24 and 26 and 28 and 30. The support members 24, 26, 28 and 30 are attached at one end of each member to the base member 22 and at the opposite end of each to a connecting member 32. In the particular embodiment of the present invention shown in FIGS. 1 and 2, additional reinforcement and support is provided for the central support members 26 and 28 by a web of material 50 between support members 26 and 28. A depending flap 34 is attached at one end to the connecting member 32, the flap 34 being disposed between, but not connected to the pair of support members 24 and 26. A second depending flap 36 is similarly attached at one end to the connecting member 32, the flap 36 being disposed between the pair of support members 28 and 30. As can best be seen in the full front and rear views of the clamp device shown in FIGS. 3 and 4 respectively, the flaps 34 and 36 are spaced apart at their side edges from the support members immediately adjacent.

Referring to FIG. 1, the base member 22 is formed with a serrated upper cable engaging surface which, in a preferred embodiment of the invention is a set of steps or ridges 42 under the free end 58 of flap 34. The steps or ridges extend across the upper face of the base member 22. The base member 22 is similarly provided with a set of stepped ridges 44 under the free end 60 of flap 36. As shown in greater detail in the cut-away side view of this embodiment of the invention given in FIG. 9, the staircase of stepped ridges 42 descends from a maximum at the rear edge 62 of the base member to a minimum near the front edge 68 of base member 22. The staircase of stepped ridges 44 is configured in a similar manner.

Figure 9:
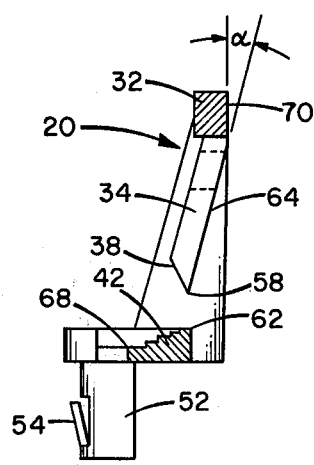
FIG. 9 is a cut-away side view of the cable clamp device of FIGS. 1 and 2, the cut taken generally along line 9—9 of FIG. 3.

As FIG. 9 shows, depending flap 34 is provided with a bevelled surface 38 at its free end. Likewise, flap 36 is provided with a bevel 40. The bevel in the leading or free end of flap 34 and flap 36 results in the flaps terminating in sharp edges 58 and 60 as can be better seen in the case of flap 34 in the cut-away side view in FIG. 9.

As further illustrated in FIG. 2 or FIG. 9, the plane of the rear surface 64 of flap 34 subtends an angle α with the plane of the rear surface 70 of connecting member 32. The angle α is preferably between about 15° and 20°, but in any event is large enough so that edge 58 of flap 34 lies slightly forward of the rear edge 62 of base member 22. The corresponding parts of flap 36 and the portion of the base member lying under flap 36 are similarly configured.

The free or leading edges 58 and 60 of depending flaps 34 and 36 terminate at a short distance away from the top surface 74 of the base member. The leading edges 58 and 60 of flaps 34 and 36 are spaced apart from the top or upper surface 74 of the base member 22 by an amount less than the thickness of the electrical cable or like article to be passed through the clamp device.

Figure 10:
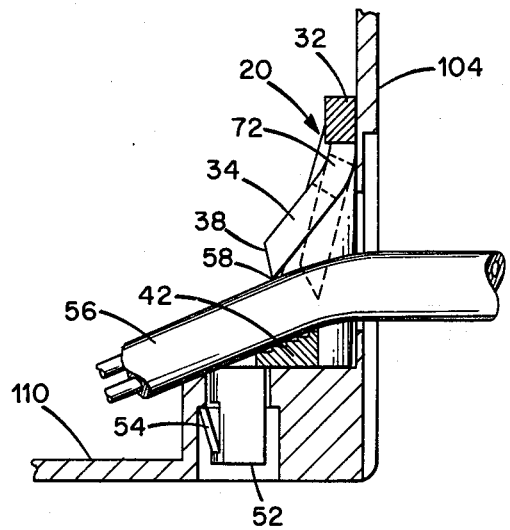
FIG. 10 is a fragmentary cut-away side view of the clamp device as shown in FIG. 9 mounted in an electrical wiring box.

The angled configuration of each depending flap and the gap or opening which results from the leading edge of each flap being spaced apart from the top surface of the base member permit an electrical cable to be inserted into the clamp device 20 by bending or distorting the flap about the region where it joins the connecting member. FIG. 10 shows in cut-away side view a nonmetallic sheathed electrical cable 56 inserted through the clamp device, between the leading edge 58 of depending flap 34 and the stepped ridges 42 of the base member. To permit the passage of the cable 56 through the clamp device, the flap 34 is deflected out of its original position, indicated by the dashed lines of FIG. 10. The flap 34 bends about the hinging region 72 where the flap is attached to the connecting member 32.

With the cable 56 in position in the clamping device, the sharp leading edge 58 of the flap 34 bears against the cable 56, forcing it against the steps or ridges 42 of the base member. The knife-edge or sharp edge 58 of the flap 34 and the stepped ridges 42 bind or clamp the cable 56 in place in the clamp device 20 by biting into or otherwise engaging the cable sheath. The cable 56 or like article is prevented from being removed from the clamp device 20 while the flap 34 engages the cable sheath, but the cable can be moved further into the clamp device by pulling or pushing.

Figure 11:
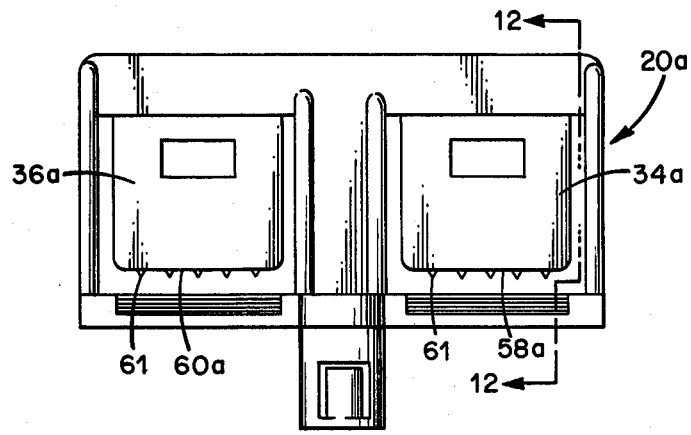
FIGS. 11 and 12 present the full front view and cut-away side view of an alternative embodiment of a clamp device according to the present invention. The cut of FIG. 12 is taken generally along line 12—12 of FIG. 11.
Figure 12:
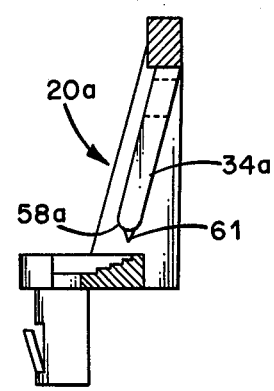

In an alternative embodiment of the clamp device 20a shown in FIGS. 11 and 12, the leading or free ends of flaps 34a and 36a are smooth or rounded as shown in the cut-away side view in FIG. 12. The edges 58a and 60a are each provided with a number of serrations or teeth 61 for gripping or engaging a cable held in the clamp. The teeth or serrations 61 of the edge 58a are made of a length less than the thickness of the cable sheathing material. The teeth or serrations are thus prevented from penetrating the cable sheath to any depth greater than the tooth length by the rounded edges 58a or 60a bearing against the cable sheath.

Figure 15:
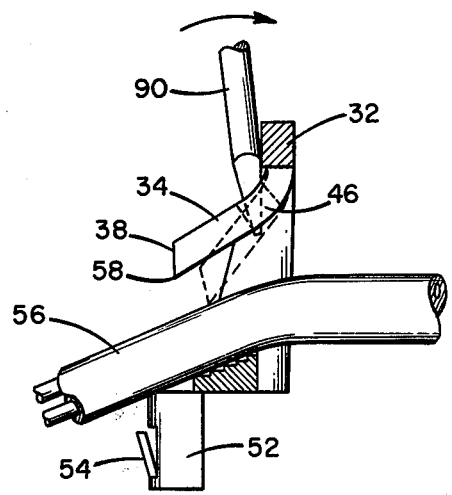
FIG. 15 is a cut-away and fragmentary side view of a tool employed in releasing a cable from the cable clamp device of FIGS. 1 and 2. The cut is taken generally along line 9—9 of FIG. 3.

In the embodiment shown in FIGS. 1 and 2, the flaps 34 and 36 of the cable clamp 20 are provided with tool-receiving slots 46 and 48. The tool-receiving slots 46 and 48 accept a tool such as a screwdriver or the like as illustrated in FIG. 15. As shown there, the bit of a screwdriver is inserted into slot 46 and the shank of the screwdriver 90 is pried in the direction of the arrow to flex the flap 34 upward, releasing the cable 56. This feature permits removal of the cable from the clamp if necessary.

The flaps of cable clamp devices of the present invention are formed of a sufficiently flexible material so that they may flex enough to accomodate cables or like articles of a variety of sizes. Yet the material must also be resilient enough to cause the flexed or deformed flap to bear against an article inserted into the clamp device. In the preferred embodiment, the clamp device is fabricated in unitary or one-piece construction of a moldable thermoplastic material. Thermoplastic materials having a flexural modulus of between about 400,000 psi and 1,050,000 psi at 73° F. are used. Preferred materials are nylon, polyacetal resin, polycarbonate resin, phenolynoxide resin, acrylonitrile-butadiene-styrene (ABS) copolymer, and rigid polyvinyl chloride (PVC).

Figure 6:
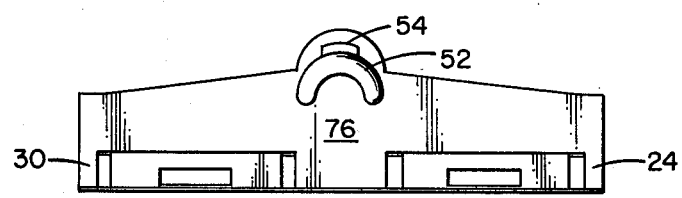
Figure 7:
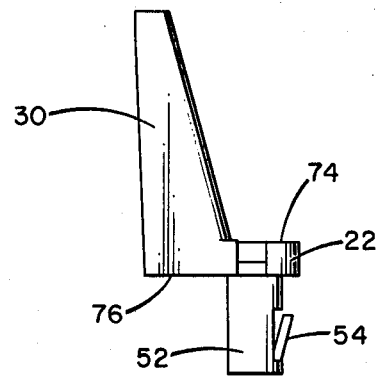
Figure 8:
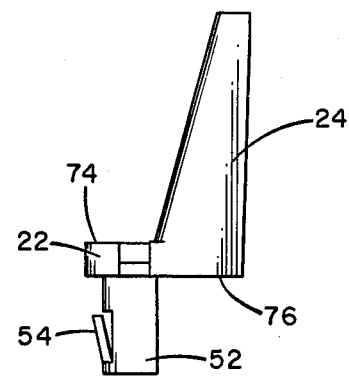

As shown in FIGS. 1–4, the base element 22 of the clamp device 20 is provided with a mounting post 52 which has a latch 54. The mounting post 52 permits the mounting or attachment of the clamp device in a socket of an electrical wiring box. As shown in the bottom view of the clamp device 20 in FIG. 6, the post 52 has an arcuate cross section to permit flexure for a tight fit in the socket. Alternatively, the mounting or attaching post may be a hollow tube with one or more longitudinal slots.

The attaching post 52 is provided with a latch 54 consisting of a small flap or ear attached at one of its ends to the post 54. The latch 54 extends outward from the post 54 at a slight angle.

Figure 13:
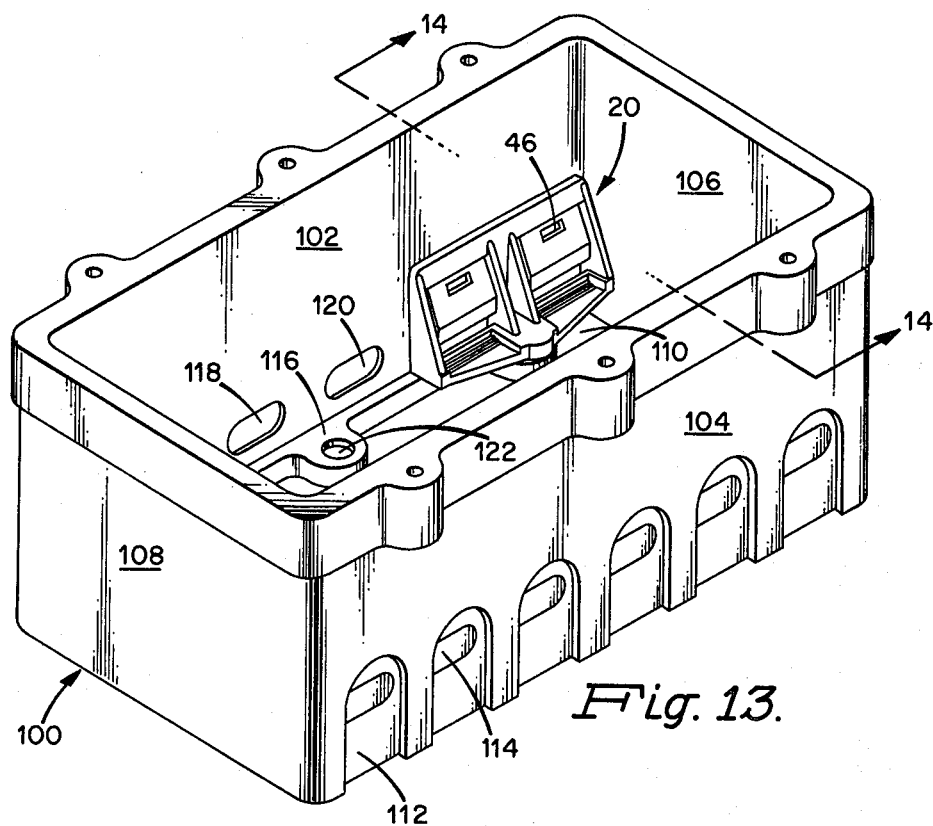
FIG. 13 shows a wiring box arrangement in accordance with the present invention with the cable clamp device of FIGS. 1 and 2 mounted in a rigid-wall electrical wiring box.

FIG. 13 illustrates the clamp device 20 inserted in a rigid wall electrical outlet box 100. The box shown is of a type fabricated of a filled or unfilled thermosetting plastic such as a phenol-formaldehyde or urea-formaldehyde resin, although clamps in accordance with this invention may be used with rigid-wall boxes of any material, including metal.

Figure 14:
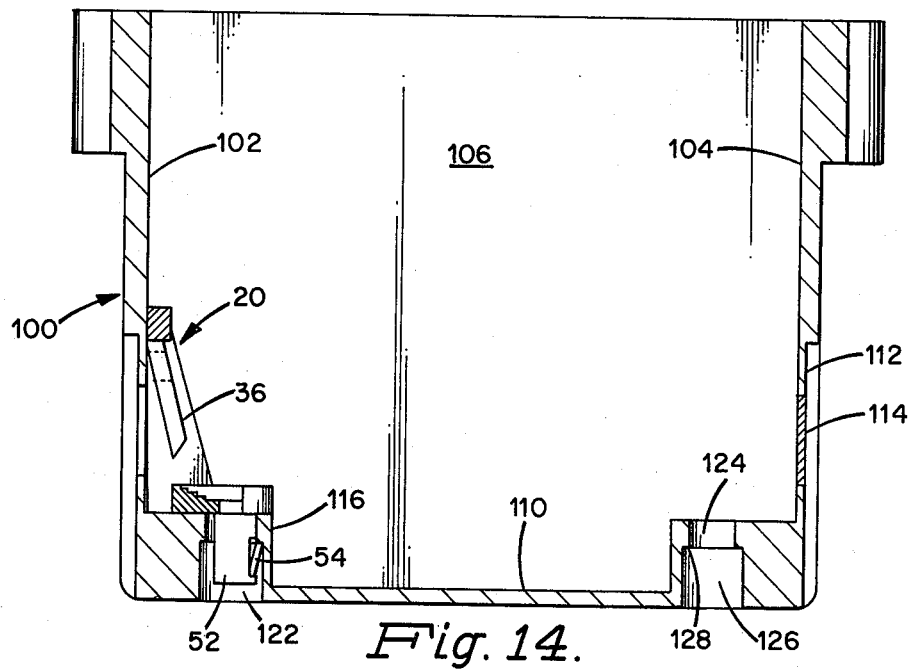
FIG. 14 presents a cut-away view of the wiring box arrangement of FIG. 13, the cut taken generally along line 14—14 of FIG. 13.

As shown in FIGS. 13 and 14, the box 100 has front-to-rear walls 102, 104, 106, and 108 and a rear wall 110. Walls 102 and 104 have pairs of molded knock-out regions, exemplified by 112. A frangible knock-out 114 consisting of a molded thin-wall area is provided in each knock-out region 112.

Interior to the box 100, a boss 116 is centrally disposed between each pair of adjacent knock-outs, as shown for knock-outs 118 and 120. Each boss, as in the case of boss 116 is provided with a hole or socket 122, which passes entirely through the boss 116, to receive the attaching or mounting post 52 of the clamp device 20. As shown in FIG. 14, each socket 122 is formed with a region 124 of small bore and a region 126 of a larger bore to provide a shoulder 128. As shown in cut-away side view in FIG. 14, when the clamp device 20 inserted in the box 100, the latch 54 of the mounting post 52 engages the shoulder 128 of socket 122 to firmly hold the clamp device in place. The clamp device can be easily removed from the box if desired by inserting a tool into the larger region 126 of the socket 122 from the outside of the box and depressing the latch 54.

Electrical wiring box arrangements according to the present invention afford a number of advantages over known arrangements. Clamp devices of this invention can be easily and inexpensively manufactured in one piece of molded thermoplastic material. The clamp devices can be inserted quickly into the wiring box in a position adjacent to a knock-out opening where needed by the user, obviating the need to supply the wiring box with a clamp device already in place adjacent to each knock-out. The clamp device of this invention snaps into or latches into the wall of the wiring box, eliminating the need for threaded fasteners or threaded openings in the box wall.

To utilize the wiring box arrangement of this invention, one or more of the frangible knock-outs, exemplified by 114, is removed to form a knock-out aperture in the box wall, as for example 118 or 120. A clamp device 20 is inserted or clipped into a receiving socket 122 in a boss 116 in the box 100, the clamp device being positioned adjacent to a knock-out aperture. A non-metallic sheathed cable is pushed through the knock-out aperture from the outside of the box and then through the clamp device, with the desired length of cable pushed or pulled into the wiring box. If the need arises to remove the cable, the retaining flap may be pried upward with a screwdriver or like tool.

While there has been shown and described what is at present believed to be the preferred embodiments of the present invention, it will be obvious to those skilled in the art that various changes and modifications may be made therein without departing from the scope of the invention as defined by the appended claims.

What is claimed is:

1. An electrical wiring box arrangement of a wiring box and cable clamp device, including in combination:
   a wiring box comprising:
      a wall structure defining front to rear walls and a rear wall therebetween which in combination define a chamber within the box; said wall structure having a knock-out region for providing a knock-out opening for receiving non-metallic sheathed cable, and attachment receiving means for mounting said cable clamp device interior to said box adjacent to said knock-out region; and
   a cable clamp device for non-metallic sheathed cable comprising:
      a base member having a first cable engaging means and attachment means receivable in said attachment receiving means of said box wall structure for mounting said cable clamp device in said box;
      a first and a second support member, each having a first end thereof attached to said base member;
      a connecting member disposed between said first and said second support members, said connecting member attached to a second end of each of said support members;
      said first and second support members tapering from a first width at said first end of each thereof to a narrower width at said second end of each thereof for maintaining said connecting member in a fixed position relative to said base member; and
      a substantially planar depending flap member resiliently and hingedly attached at one end thereof to said connecting member, the other end of said depending flap member providing a second cable engaging means, said second cable engaging means being spaced apart from and opposing said first cable engaging means;
      whereby a non-metallic sheathed cable passed through a knock-out opening of said wiring box having said cable clamp device attached thereto passes between said base member and said depending flap member of said clamp device and is gripped between said first cable engaging means and said second cable engaging means.

2. An electrical wiring box arrangement in accordance with claim 1 wherein said first cable engaging means comprises a serrated surface of said base member.

3. An electrical wiring box arrangement in accordance with claim 2 wherein said serrated surface comprises a plurality of stepped ridges extending across said base member.

4. An electrical wiring box arrangement in accordance with claim 1 wherein said second cable engaging means comprises a leading edge of said depending flap.

5. An electrical wiring box arrangement in accordance with claim 4 wherein said leading edge of said depending flap is serrated.

6. An electrical wiring box arrangement in accordance with claim 1 wherein said attachment receiving means comprises a socket in said wall structure of said electrical wiring box.

7. An electrical wiring box arrangement in accordance with claim 6 wherein said attachment means of said clamp device comprises a protrusion on said base member of said clamp device insertable in said socket.

8. An electrical wiring box arrangement in accordance with claim 7 wherein said protrusion is a post further having a latching means for engaging a portion of said wall structure of said box.

9. An electrical wiring box arrangement according to claim 8 wherein said clamp device is of unitary molded thermoplastic construction.

10. An electrical wiring box arrangement of a wiring box and cable clamp device, including in combination;
    a wiring box comprising:
       a wall structure defining front-to-rear walls and a rear wall therebetween which in combination define a chamber within the box;
       said wall structure having a plurality of pairs of knock-out regions for providing knock-out openings for receiving non-metallic sheathed cable, and attachment receiving means in said wall structure disposed between the knock-out regions of each of said pair, said attachment receiving means being adapted to receive a cable clamp device interior to said box adjacent to a pair of knock-out regions; and
    a cable clamp device for non-metallic sheathed cable comprising:

a base member having a first cable engaging means and attachment means for coacting with said attachment receiving means of said wiring box for mounting said clamp device adjacent to a pair of knock out regions;

a first pair and a second pair of support members, each support member being attached at a first end of each thereof to said base member;

a connecting member disposed between the support members of each of said pairs of support members, said connecting member being attached to a second end of each of said support members;

each of said support members tapering from a first width at said first end of each thereof to a narrower width at said second end of each thereof for maintaining said connecting member in a fixed position relative to said base member; and a substantially planar depending flap member resiliently and hingedly attached at one end at an angle to said connecting member between each of said pairs of support members, the other end of said depending flap member providing a second cable engaging means, said second cable engaging means being spaced apart from and opposing said first cable engaging means;

whereby a non-metallic sheathed cable passed through a knock-out opening of said wiring box having said cable clamp device attached thereto inwardly displaces said resilient depending flap member into said wiring box and passes between said base member and said depending flap member and is gripped between said first cable engaging means and said second cable engaging means.

11. An electrical wiring box arrangement in accordance with claim 10 wherein said first cable engaging means comprises a plurality of stepped ridges on said base member opposing said depending flap member and extending across said base member between one support member and the other support member of each of said pairs of support members.

12. An electrical wiring box arrangement in accordance with claim 11 wherein said second cable engaging means is a bevelled sharp edge of said depending flap member, said edge being spaced apart from and opposing said stepped ridges.

13. An electrical wiring box arrangement in accordance with claim 12 wherein said attachment receiving means of said wiring box is an aperture in said wall structure of said wiring box, said aperture being disposed between the knock-out regions of a pair of said regions, said aperture being in a portion of the wall structure of said box forming an angle with the portion of the wall structure having said knock-out regions.

14. An electrical wiring box arrangement in accordance with claim 13 wherein said aperture is provided with a shoulder for engaging said attachment means of said clamp device.

15. An electrical wiring box arrangement in accordance with claim 14 wherein said attachment means of said clamp device is a post for insertion in said aperture, said post further having a latching means for engaging said shoulder of said aperture.

16. An electrical wiring box arrangement in accordance with claim 15 wherein said clamp device is of unitary molded thermoplastic construction.

17. An electrical wiring box arrangement in accordance with claim 11 wherein said second cable engaging means is a serrated end of said depending flap member, said serrated end being spaced apart from and opposing said stepped ridges.

* * * * *